United States Patent [19]
Holland

[11] Patent Number: 6,062,131
[45] Date of Patent: May 16, 2000

[54] ROASTING STAND ADAPTED TO DELIVER FLAVORED STEAM DURING THE COOKING PROCESS

[76] Inventor: Robert B. Holland, 247 Summerwinds Dr., Cary, N.C. 27511

[21] Appl. No.: 09/152,159

[22] Filed: Sep. 11, 1998

[51] Int. Cl.[7] .............................. A47J 37/04; A47J 43/18
[52] U.S. Cl. .............................. 99/345; 99/419; 99/426; 99/446; 99/447
[58] Field of Search .............................. 99/345–347, 401, 99/415–418, 419–421 V, 426, 425, 446, 447–450; 426/509, 523

[56] References Cited

U.S. PATENT DOCUMENTS

| | | | |
|---|---|---|---|
| 1,349,302 | 8/1920 | Spitz | 99/346 |
| 2,821,904 | 2/1958 | Arcabosso | 99/346 |
| 3,020,824 | 2/1962 | Pantermoller | 99/346 |
| 3,392,665 | 7/1968 | Harnest | 99/426 |
| 3,713,378 | 1/1973 | West et al. | 99/346 |
| 4,450,759 | 5/1984 | Steibel | 99/419 |
| 4,633,773 | 1/1987 | Jay | 99/446 |
| 4,709,626 | 12/1987 | Hamlyn | 99/449 |
| 5,081,916 | 1/1992 | Khuling et al. | 99/419 |
| 5,106,642 | 4/1992 | Ciofalo | 426/523 |
| 5,301,602 | 4/1994 | Ryczek | 99/345 |
| 5,575,198 | 11/1996 | Lowery | 99/426 |
| 5,893,320 | 4/1999 | Demaree | 99/419 |

*Primary Examiner*—Timothy Simone
*Attorney, Agent, or Firm*—Jenkins & Wilson, P.A.

[57] ABSTRACT

A roasting stand particularly adapted for use in imparting flavoring steam to a chicken or the like during the cooking process within an indoor oven, outdoor grill or the like. The roasting stand comprises an elongate hollow tube with an open end and a closed end, and a plurality of apertures provided around the circumference of the tube from medial portion and upwards toward the open end of the tube. The closed end of the tube forms a cavity for receiving a flavoring liquid such as liquid smoke. The roasting stand further includes a cap element for removably closing the open end of the tube, and a support base provided around at least a portion of the circumference of the closed end of the tube to support the tube in an upright position with the open end at the top thereof. Thus, the roasting stand will serve to supporting retain a chicken thereon and will deliver flavoring steam from the tube cavity to the inside of the body cavity of the chicken or the like during the cooking process.

8 Claims, 4 Drawing Sheets

ROASTING STAND ADAPTED TO DELIVER FLAVORED STEAM DURING THE COOKING PROCESS

TECHNICAL FIELD

The present invention relates to roasting stands for use during cooking in an oven, grill or the like, and more particularly to an improved roasting stand that is adapted to deliver flavored steam inside the body cavity of chicken or the like during the cooking process.

RELATED ART

The roasting stand prior art includes a number of various devices intended to support a chicken or the like in a vertical position in an indoor oven or outdoor grill or the like. For example, applicant is aware of a wire structure defining a wide base and a relatively narrow upright column configuration that provides a means of supporting a chicken in an upright vertical position during roasting. However, this prior art structure does not provide for a flavoring liquid compartment so as to provide flavored steam to be created and delivered to the inside of the body cavity of the chicken being roasted.

Also, the applicant is aware of a similar structure to the aforementioned wire structure that is formed of a solid surface material in a beaker shape wherein the base portion includes a basin to provide means for holding a flavoring liquid therein. However, although this prior art roasting stand does provide for flavoring liquid in the basin at the base to create a flavored steam during the cooking process, the structure does not contemplate and consequently does not provide any means to deliver the flavored steam into the body cavity of the chicken being roasted. This prior art roasting stand merely allows flavored steam to generally rise around the chicken body to provide flavoring thereto. Of course, during the process of providing flavored steam around the chicken body, a portion of the flavored steam may go into the body cavity of the chicken being roasted, but applicant believes that only a minor amount of flavored steam will find its way into the body cavity of the chicken being cooked.

Thus, the search for an improved roasting stand that provides flavored steam directly to the internal body cavity of a chicken being roasted has continued, and applicant believes that there is a long-felt need for such a novel device.

DISCLOSURE OF THE INVENTION

In accordance with the present invention, applicant provides a roasting stand for use in cooking a chicken or the like within a cooking apparatus such as an outdoor grill or an indoor oven wherein the roasting stand comprises an elongate hollow tube having an open end and a closed end. A plurality of apertures are provided around the circumference of the tube and extend at least in part from the medial portion to the open end of the tube, and the closed end of the tube forms a cavity for receiving a flavoring liquid. A cap element is provided for removably closing the open end of the tube, and a support base is provided around at least a portion of the circumference of the closed end of the tube so as to support the tube in an upright position with the open end at the top thereof. In this fashion, the stand can be positioned in a cooking apparatus such as an outdoor grill or an indoor oven and a chicken or the like supportingly positioned thereon so as to deliver flavoring steam from the tube to the inside of the body cavity of the chicken or the like.

Also, in accordance with the present invention, applicant provides a method for roasting a chicken or the like within a cooking apparatus such as an outdoor grill or an indoor oven. The method comprises providing a roasting stand as described hereinabove, and introducing a flavoring liquid into the tube cavity and closing the open end of the tube of the roasting stand with the cap element. The method further comprises supportingly placing a chicken or the like over the upright elongate tube of the roasting stand. Next, the method includes positioning the roasting stand within a cooking apparatus in an upright position and heating the cooking apparatus in which the roasting stand has been positioned so as to cook the chicken or the like and to concurrently boil the flavoring liquid within the tube of the roasting stand. Thus, flavoring steam is caused to exhaust from the tube apertures into the inside of the body cavity of the chicken or the like being cooked.

It is therefore an object of the present invention to provide a roasting stand for use with a conventional grill or oven in order to support a chicken or the like in a vertical position in the cooking compartment and to deliver flavoring steam extensively throughout the inside of the body cavity of the chicken or the like during cooking.

More specifically, it is an object of the present invention to provide an improved roasting stand that is adapted to deliver flavoring steam directly to the inside of the body cavity of a chicken or the like that is vertically positioned thereon to provide enhanced flavoring of the meat.

Some of the objects of the invention having been stated, other objects will become evident as the description proceeds, when taken in connection with the accompanying drawings described below.

BEST MODE FOR CARRYING OUT THE INVENTION

Figure 1:
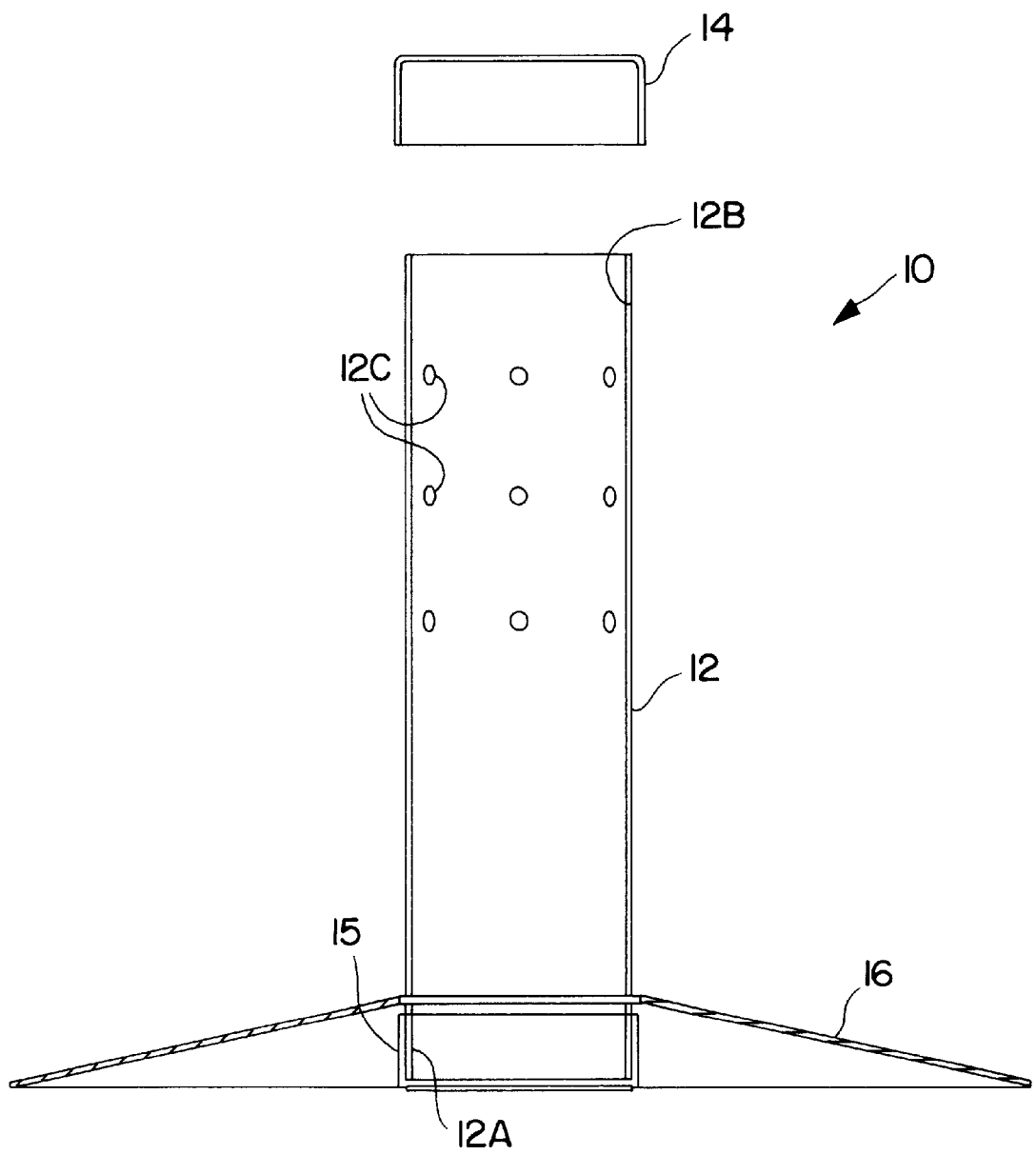
FIG. 1 is a vertical cross-sectional view of the roasting stand of the present invention with the cap removed.
Figure 2:
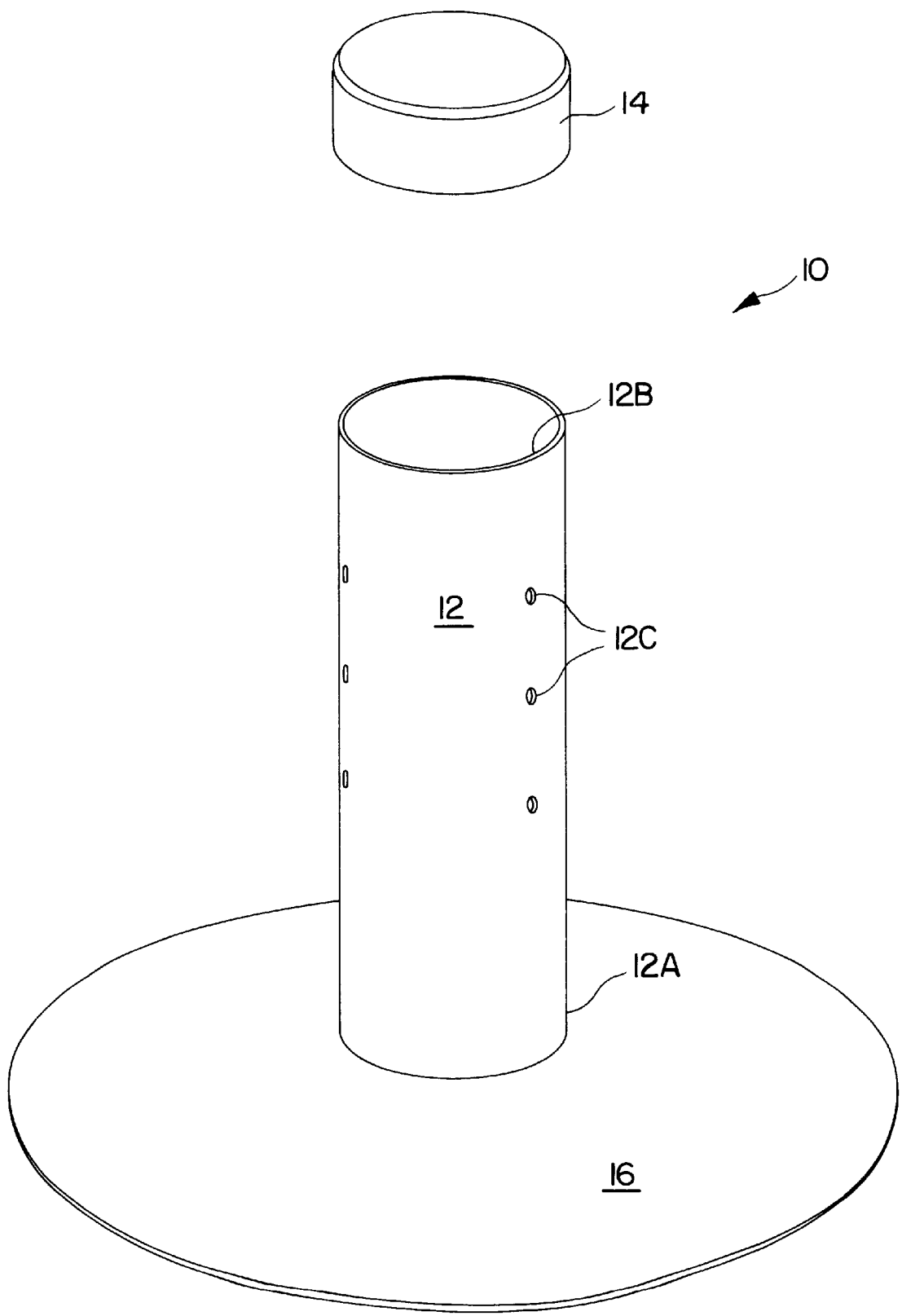
FIG. 2 is a perspective view of the roasting stand of the present invention with the cap removed.
Figure 3:
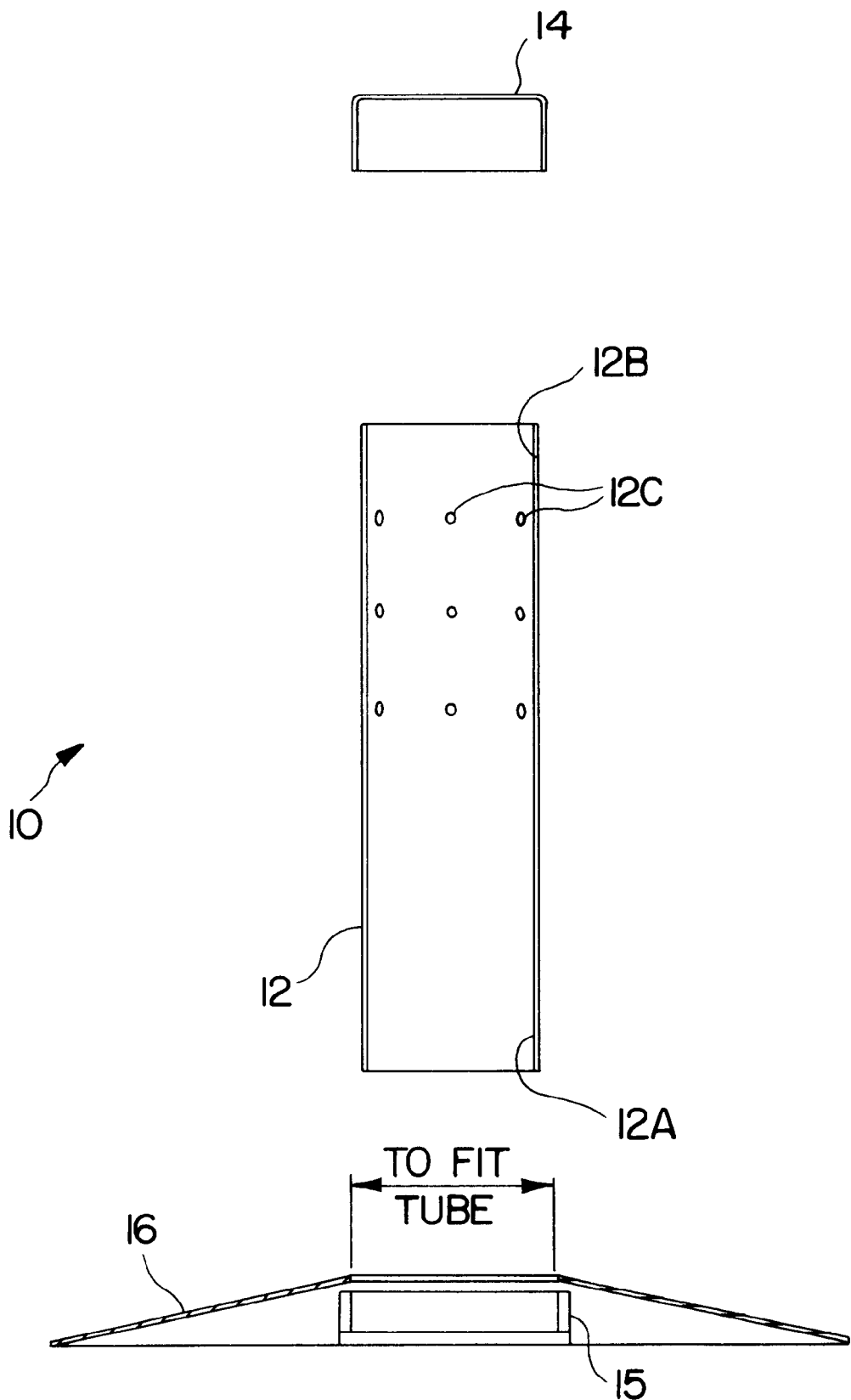
FIG. 3 is an exploded vertical cross-sectional view of the roasting stand of the present invention.
Figure 4:
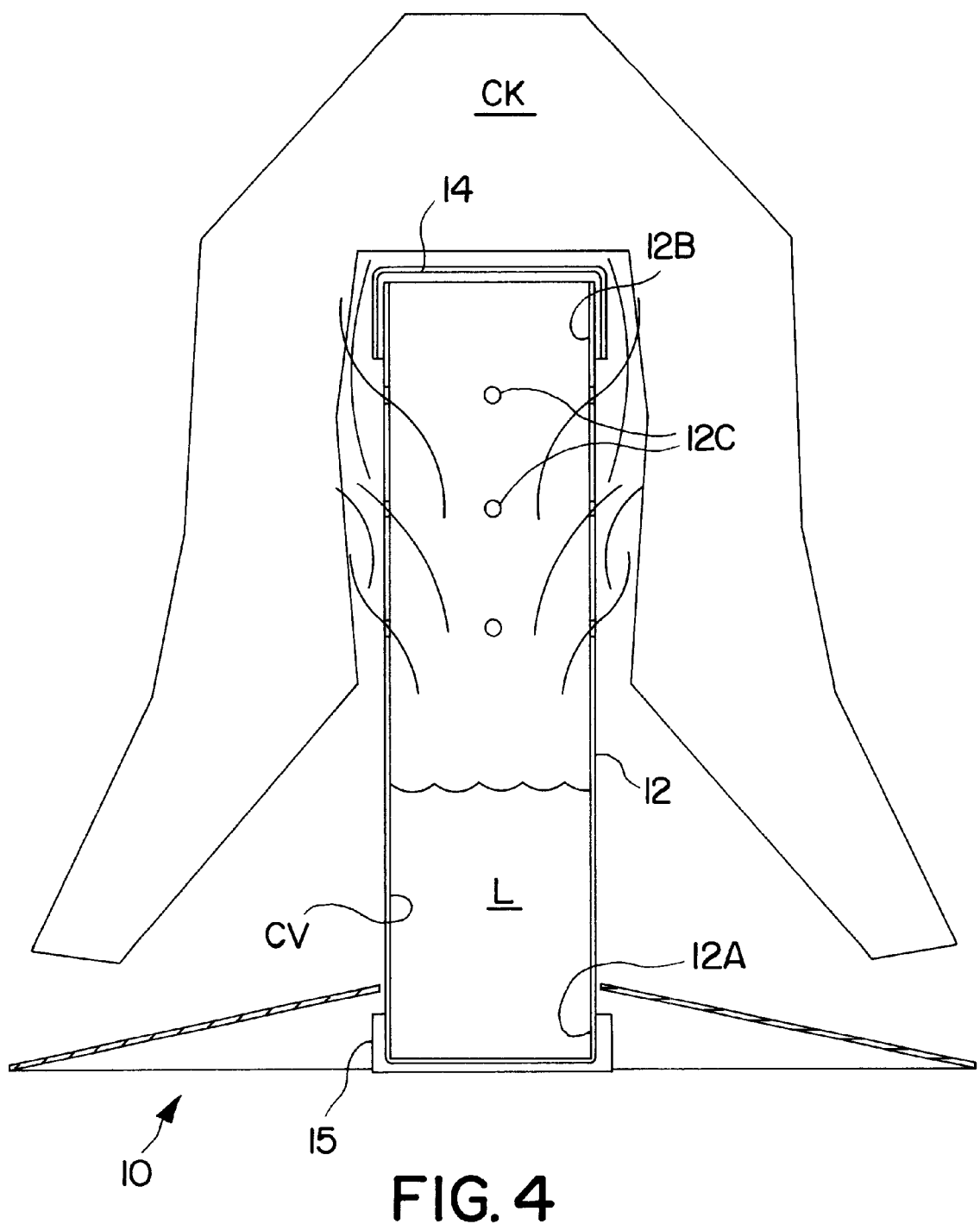
FIG. 4 is a vertical cross-sectional view of the roasting stand of the present invention with a chicken positioned thereon so that flavored steam is being imparted to the inside of the body cavity of the chicken.

Referring now to FIGS. 1–4 of the drawings, a preferred embodiment of a roasting stand 10 constructed in accordance with the present invention comprises an elongate hollow tube 12 that has closed end 12A at the bottom thereof and open end 12B at the top thereof. A plurality of apertures 12C are provided around the circumference of tube 12 that extend generally from the medial portion thereof upward towards open end 12B of elongate hollow tube 12. Closed end 12A of elongate hollow tube 12 forms a cavity CV therein (see particularly FIG. 4) for receiving and retaining a flavoring liquid L therein. Most suitably, flavoring liquid L can be selected from liquids such as liquid smoke, beer, wine, barbecue sauce, or any flavoring liquid.

A removable cap 14 is provided for being snugly fitted over open end 12B of the tube in order to close open end 12B of tube 12. Closed end 12A of tube 12 is shown with fixed cap 15 welded to otherwise open end 12A, but closed end 12A could be formed in any suitable manner including as a unitary closed end (not shown) without fixed cap 15. Further, a support base 16 is provided around the circumference of closed end 12A of tube 12 so as to support the tube in an upright position as shown in the drawings with open end 12B at the top of stand 10. In this fashion, roasting stand 10 can be positioned in a cooking apparatus (not shown) such as an indoor oven or an outdoor grill and a chicken CK or the like then supportingly positioned thereon (see particularly FIG. 4) so that roasting stand 10 can deliver flavoring steam from cavity CV at the bottom of tube 12 to the inside of the body cavity of chicken CK in a manner to be further described hereinafter.

Roasting stand 10 is preferably formed of aluminum or other material such as copper or stainless steel and hollow tube 12 is most suitably about 4 to 6 inches in length and about 1.5 to 2.0 inches in diameter. Although other configurations are contemplated as within the scope of the invention, apertures 12C in the preferred embodiment of the invention shown in FIG. 1–4 of the drawings comprise three spaced-apart rows in the upper portion of tube 12 and define holes about 0.10 inches in diameter through the cylindrical wall of the tube.

The purpose of roasting stand 10 is to support chicken CK in a vertical position in the cooking department of an indoor oven or outdoor grill or the like, and to deliver flavoring in the form of seasoned steam extensively throughout the inside of the body cavity of chicken CK during the cooking process. Unlike prior art roasting stands, applicant's roasting stand 10 acts to deliver flavored steam extensively inside the body cavity of chicken CK (see particularly FIG. 4) as it is being cooked since flavoring liquid L inside cavity CV of closed end 12A of tube 12 is caused to boil by the heat of the cooking process. Once flavoring liquid L located in cavity CV of tube 12 is boiling, a flavored steam is created that is in turn delivered through apertures 12C to the inside of the body cavity of chicken CK in order to achieve a more complete flavoring during cooking of the chicken.

In operation, the basic principle of the invention is to deliver flavoring steam into the inside of the body cavity of a chicken or the like during the cooking process in order to achieve enhanced flavoring of the meat as it is cooked. First of all, cap 14 is removed from tube 12 and a suitable flavoring liquid is poured therein so as to collect in cavity CV at closed end 12A of elongate hollow tube 12, and cap 14 is then sealingly attached to open end 12B of tube 12 to form a substantial sealing engagement. A chicken CK or the like is then supportingly positioned on tube 12 (see FIG. 4) of roasting stand 10, and roasting stand 10 is then positioned within a cooking apparatus in an upright position. Finally, the cooking apparatus (e.g., the cooking compartment of an indoor or outdoor grill) is heated so as to cook chicken CK or the like and to concurrently boil flavoring liquid L within tube 12 so that flavoring steam is created and driven through apertures 12C of tube 12 into the inside of the body cavity of chicken CK or the like. In this manner, chicken CK is provided with a delectable enhanced flavoring superior to that available heretofore by any roasting stands known to applicant.

It will be understood that various details of the invention may be changed without departing from the scope of the invention. Furthermore, the foregoing description is for the purpose of illustration only, and not for the purpose of limitation—the invention being defined by the claims.

What is claimed is:

1. A roasting stand for use in cooking a chicken within a cooking apparatus such an outdoor grill or an indoor oven, said roasting stand comprising:

(a) an elongate hollow tube having an open end and a closed end;

(b) a plurality of apertures provided around the circumference of said tube and extending at least in part from the medial portion to the open end of said tube, the closed end of said tube forming a cavity therein for receiving a flavoring liquid;

(c) a cap element for removably closing the open end of said tube; and (d) a support base provided around at least a portion of the circumference of the closed end of said tube so as to support said tube in an upright position with the open end at the top thereof;

whereby said stand can be positioned in a cooking apparatus such as an outdoor grill or an indoor oven and a chicken supportingly positioned thereon so as to deliver flavoring steam from said tube cavity to the inside of the body cavity of the chicken.

2. The roasting stand according to claim 1, wherein said elongate hollow tube is about 4–6 inches in length and about 1.5–2.0 inches in diameter.

3. The roasting stand according to claim 1, wherein said plurality of apertures comprises three spaced-apart rows of apertures.

4. The roasting stand according to claim 3, wherein said apertures are about 0.10 inches in diameter.

5. The roasting stand according to claim 1, wherein said flavoring liquid is selected from a group comprising liquid smoke, beer, wine, barbecue sauce and any flavoring liquid.

6. The roasting stand according to claim 1, wherein said cap element removably fits over the open end of said elongate tube so as to sealingly engage said elongate tube.

7. The roasting stand according to claim 1, wherein said support base extends downwardly and outwardly from the entire circumference of said elongate tube.

8. The roasting stand according to claim 1, wherein said roasting stand is formed of aluminum, copper, or stainless steel.

* * * * *